Nov. 24, 1953
H. C. KURTZ
2,660,440
COMPENSATING HYDRAULIC JAW
Filed Sept. 26, 1950
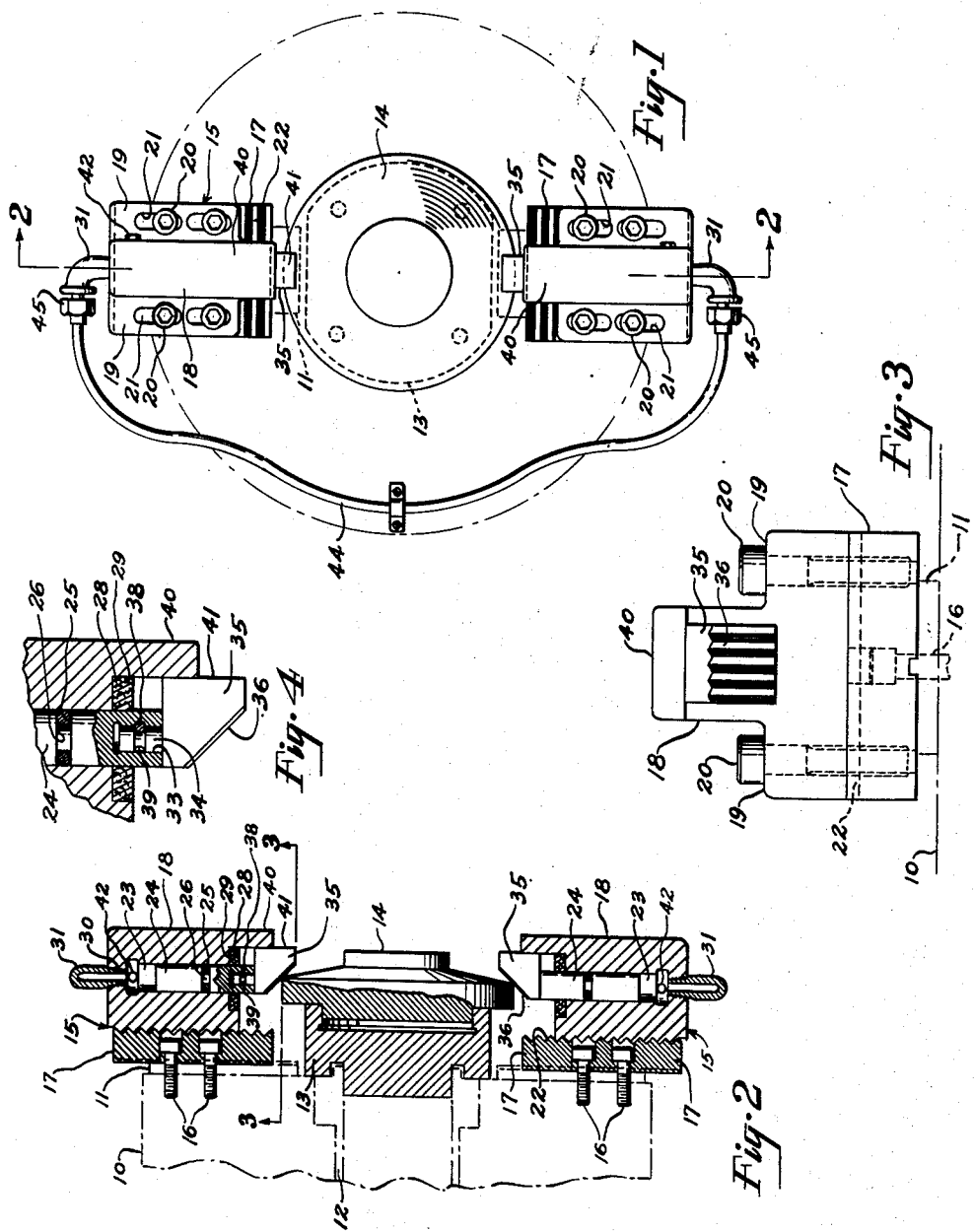
INVENTOR.
HERMAN C. KURTZ
BY
Fay, Gobrick & Fay
ATTORNEYS Patented Nov. 24, 1953

2,660,440

UNITED STATES PATENT OFFICE 2,660,440

COMPENSATING HYDRAULIC JAW

Herman C. Kurtz, Medina, Ohio

Application September 26, 1950, Serial No. 186,849

7 Claims. (Cl. 279—4)

The present invention relates to improvements in jaws for use with chucks or other work holders, particularly for use where a work piece is first located in the holder or chuck by means independent of the work-gripping surfaces. In brief, the present invention provides a plurality of work-gripping jaws on the movable jaw bases or carriages of a chuck or work holder, each jaw having an hydraulic cylinder with a piston carrying a work-gripping face, the cylinders being commonly interconnected hydraulically.

In the methods of mass production, there occur many unit operations in which a work piece having certain areas already machined is positioned in a machine for further work by means of the previously machined surfaces which may serve as gauging points or surfaces. Work locators, having surfaces complementary to, or corresponding in some way to the machine or work holding device into which the work piece is to be placed for further operation, and having a form to receive the work piece in definite position by means of the previously machined surfaces, are often used to facilitate proper and exact positioning of the work piece on the chuck or work holder of the machine. Clamping jaws are then brought to bear on the located work piece, the jaws usually being on jaw carriages moved by a quick-acting pneumatic, hydraulic or mechanical system. For speed in the operation of the tool and accuracy in the work to be done it is necessary that the quick-acting clamping jaws come to bear on the work piece for secure clamping without disturbing the pre-setting or centering of the piece and without necessity of adjustment of the jaws to effect even bearing pressure. Often the pieces which are to be clamped, either by design of the shape or by reason of adventitious irregularities in the surface thereof, cannot be quickly and accurately clamped unless some compensating means is provided in the jaw clamping system which makes up for the irregularities causing dissymmetry in the work piece. Hitherto, there have been compensating means devised to meet this need, but such devices have had among other disadvantages, lack of simplicity in construction, relatively small compensating range, uncertainty in compensating action, or the need of specific manual operations to attain the needed compensation.

The main object of the present invention is the provision of a compensating gripping jaw system which will automatically compensate for irregularities in the surface of the work piece when the jaws are brought to bear thereon.

Another object is the provision of a compensating jaw system the span of which is readily adjusted for clamping pieces of different size or shape.

Another object is the provision of a relatively simple hydraulic compensating system for the jaws.

Another object is the provision of compensating gripping jaws which are actuated upon the operation of the jaw carriages bringing the jaws to bear on a work piece without need of any independent manual or other operation to attain compensation.

With the above and other objects in view, which will be apparent from the detailed description which follows, the invention consists in certain novel features of construction and combination of parts which will be readily understood by those skilled in the art to which the invention appertains. In the drawings which illustrate an embodiment of the invention—

Fig. 1 is a plan view of compensating jaws as provided by this invention for application to a chuck or work holder;

Fig. 2 is a cross-sectional view taken along the line 2—2 of Fig. 1;

Fig. 3 is an enlarged view of the work end of one of the jaws taken from the line 3—3 of Fig. 2; and Fig. 4 is an enlarged fragmentary sectional view of the working end of the piston in Fig. 2.

The drawings show in partial outline form the body 10 of a rotatable chuck or other work holder provided with jaw carriages 11 which are movable in the body 10 by any means (not shown), such as pneumatic pistons or cylinders or some mechanical device. A pilot bushing 12, also shown in outline form, fits into a corresponding aperture or cavity in the body 10 and is adapted to receive a work holder 13 which carries and properly locates the work piece 14 in a position desired for further work operations. The compensating jaws of this invention indicated by the general reference numeral 15 are held on the jaw carriages 11 by bolts 16 extending through the compensating jaw base 17 into the carriages. On each base 17 a jaw cylinder block 18, having at the bottom flanges 19, is adjustably held by bolts 20 extending through adjustment slots 21 in the flanges into the base 17. The adjacent faces of bases 17 and cylinder block 18 are provided with corresponding serrations 22 to insure against slippage between the surfaces. Each jaw cylinder block 18 is provided with a cylinder bore 23 in which moves a piston 24 provided with a piston ring 25, such as an "O-ring," in the circumferential groove 26. At the forward or work end of the cylinder there is provided an end seal 28 in the circumferential groove or channel 29 about the working or gripping end of the piston. The rear end of the cylinder is provided with a threaded aperture 30 for receiving a connecting fitting such as the elbow 31. The working end of the piston is axially bored at 33 to receive the cylindrical projection 34 of a work gripping piece 35 provided with a serrated work gripping face 36 suitably disposed according to the type or shape of the work to be held. The piston 24 is rotatably movable with respect to the gripping piece 35 but axial displacement between these members is prevented by a pin 38 carried by the piston and fitting in the circumferential groove 39 on projection 34. To prevent the gripping piece 35 from rotating, a guiding lug 40 is provided on the cylinder block against the face of which slides the upper surface 41 of the gripping piece 35. A filling aperture and plug therefor, jointly designated 42, are provided at the rearward end of each cylinder for filling the system with hydraulic fluid or if necessary for bleeding air therefrom.

In the drawings two oppositely disposed jaws are shown arranged for gripping the exterior of a work piece. Between these jaws a flexible hydraulic line 44 is provided, the ends whereof are joined to the elbows 31 by couplings 45 for hydraulic connection of the cylinders. If desired, more than two such jaws may be used, positioned as needed for further gripping of the work piece, in which event the flexible hydraulic line 44 would be connected by suitable fittings to such additional jaws. It is to be understood, of course, that such jaws could be used for internal clamping of a work piece by having the position of the jaws reversed on each carriage base 11.

As the jaw carriages 11 move inwardly carrying the jaw blocks toward the work, if the work is unsymmetrical or rough one gripping piece may encounter the work before the other. With the continued advance of the jaw block towards the work, the gripping piece which first encounters the work is moved freely backward relative to its cylinder block, thereby moving its piston into the cylinder to displace hydraulic fluid from the cylinder through the line 44 and into the opposed cylinder, advancing the other unobstructed gripping piece ahead of its jaw block so that it encounters the work sooner than it would had it not been so displaced. Within the limits of compensation the unobstructed jaw will come to bear upon the work piece also before the limit of movement relative to the jaw block has been reached by the initially obstructed gripper piece. When the two gripper pieces are in contact with the work, of course, equal pressure is then brought to bear upon the work piece. Thus the work is not distorted or displaced from its proper location. Such a compensation is adaptable to provide a larger compensation range than is generally feasible with any mechanical means of compensation. Furthermore, the device is simple, relatively inexpensive in construction and positive in operation. Further, by means of the adjusting screws and slots 20 and 21, the jaws are readily positioned to accommodate a new size or shape of work piece, for example, in changing from one production line of articles to another. The adjustability of the jaw blocks on the jaw bases 17 also has the advantage of adaptation to work pieces which are by design asymmetric, with respect to a desired turning center, at the section to be gripped, so that the compensation range is available for handling other irregularities.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. For a work holder having a body, a plurality of movable jaw carriages on the body, and means for moving said carriages toward and away from a work-piece; a compensating system of hydraulic jaws to grip a work-piece comprising: a compensating hydraulic work-piece gripping jaw for each of said carriages, each jaw including a jaw base mounted on the carriage, an hydraulic cylinder block adjustably mounted on the jaw base for adjustment in the line of motion of the corresponding jaw carriage, a piston movable in the cylinder of the block, and a work-piece gripping member carried on said piston; and hydraulic connecting means commonly interconnecting the hydraulic cylinders.

2. For a work holder having a body, a plurality of movable jaw carriages on the body, and means for moving said carriages toward and away from a work-piece; a compensating system of hydraulic jaws to grip a workpiece comprising: a compensating hydraulic work-piece gripping jaw for each of said carriages, each jaw including a jaw base mounted on the carriage, an hydraulic cylinder block adjustably mounted on the jaw base for adjustment in the line of motion of the corresponding jaw carriage, a piston movable in the cylinder of the block, a work-piece gripping member carried on said piston, said piston being rotatively free with respect to said gripping member, and guide means on said cylinder block for said gripping member; and hydraulic connecting means commonly interconnecting the hydraulic cylinders.

3. For a work holder having a body, a plurality of movable jaw carriages disposed on the body in opposed paired relation, and means for moving said carriages; a compensating system of hydraulic jaws to grip a workpiece comprising: an hydraulic work-piece gripping jaw for each of said carriages, each jaw including a jaw base mounted on the carriage, an hydraulic cylinder block adjustably mounted on the jaw base, a piston movable in the cylinder of the block, a workpiece gripping member carried on said piston, said piston being rotatively free with respect to said gripping member, and guide means on said cylinder block for said gripping member; and hydraulic connecting means commonly interconnecting the hydraulic cylinders in a closed hydraulic system.

4. For a work holder having a body, a plurality of movable jaw carriages disposed on the body in opposed paired relation, and means for moving said carriages; a compensating system of hydraulic jaws to grip a workpiece comprising: an hydraulic work-piece gripping jaw for each of said carriages, each jaw including a jaw base mounted on the carriage, an hydraulic cylinder block adjustably mounted on the jaw base, a piston movable in the cylinder of the block, a work-piece gripping member carried on said piston, said piston being rotatively free with respect to said gripping member, and guide means on said cylinder block for said gripping member; hydraulic connecting means commonly interconnecting the hydraulic cylinders in a closed hydraulic system; and work-piece locating means disposed on said body of the holder between the paired jaws.

5. For a work holder having a body, a plurality of movable jaw carriages on the body, and means for moving the carriages, a compensating system of hydraulic jaws to grip a work-piece comprising: a jaw base mounted on each of said carriages, an hydraulic cylinder block adjustably mounted on each of said jaw bases, a piston for each block movable in the cylinder thereof, each of said pistons carrying a work-piece gripping member, and hydraulic connecting means commonly interconnecting the hydraulic cylinders in a closed hydraulic system.

6. For a work holder having a base, a plurality of movable jaw carriages on the base, and means for moving the carriages, a compensating system of hydraulic jaws to grip a work-piece comprising: a jaw base mounted on each of said carriages, an hydraulic cylinder block adjustably mounted on each of said jaw bases, a piston for each block movable in the cylinder thereof, each of said pistons carrying a work-piece gripping member in rotatively free relation to the piston, guide means on said cylinder blocks for said gripping members, and hydraulic connecting means commonly interconnecting the hydraulic cylinders in a closed hydraulic system.

7. A work holder having a body, a plurality of jaw carriages movable on the body disposed in opposed paired relation, and a compensating system of hydraulic jaws to grip a work-piece; said system comprising an hydraulic work-piece gripping jaw mounted on each of said carriages, each compensating jaw including an hydraulic cylinder block adjustably mounted relative to said body, a piston movable in the cylinder of said block, a work-piece gripping member carried on said piston, said piston being rotatably free with respect to said gripping member, guide means on said cylinder block for said gripping member, and hydraulic connecting means connecting as a closed hydraulic system the two hydraulic cylinders on opposed paired carriages.

HERMAN C. KURTZ.

References Cited in the file of this patent

UNITED STATES PATENTS

| Number | Name | Date |
|---|---|---|
| 1,825,677 | Page | Oct. 6, 1931 |
| 2,188,095 | Hartsuff | Jan. 23, 1940 |
| 2,273,845 | Drissner et al. | Feb. 24, 1942 |
| 2,323,091 | Johnston et al. | June 29, 1943 |
| 2,451,705 | Adair | Oct. 19, 1948 |
| 2,597,280 | Barnes | May 20, 1952 |